(12) United States Patent
Kataria et al.

(10) Patent No.: US 7,924,857 B2
(45) Date of Patent: Apr. 12, 2011

(54) METHODS AND APPARATUS FOR REORGANIZING CELLS BUFFERED AFTER TRANSMISSION

(75) Inventors: Deepak Kataria, Edison, NJ (US); Codrut Radu Radulescu, Hillsdale, NJ (US)

(73) Assignee: Agere Systems Inc., Allentown, PA (US)

( * ) Notice: Subject to any disclaimer, the term of this patent is extended or adjusted under 35 U.S.C. 154(b) by 1399 days.

(21) Appl. No.: 11/326,047

(22) Filed: Jan. 5, 2006

(65) Prior Publication Data

US 2007/0153819 A1 Jul. 5, 2007

(51) Int. Cl.
*H04L 12/56* (2006.01)

(52) U.S. Cl. ........ 370/412; 370/368; 370/394; 370/420; 370/249; 711/162

(58) Field of Classification Search .............. 370/250, 370/368, 394, 420, 412, 395, 465; 395/600, 395/425, 575; 711/161, 162; 250/551
See application file for complete search history.

(56) References Cited

U.S. PATENT DOCUMENTS

| | | | | |
|---|---|---|---|---|
| 5,065,035 | A * | 11/1991 | Juengel .................... | 250/551 |
| 5,619,497 | A * | 4/1997 | Gallagher et al. ........... | 370/394 |
| 6,246,684 | B1 * | 6/2001 | Chapman et al. ........... | 370/394 |
| 6,788,686 | B1 * | 9/2004 | Khotimsky et al. .......... | 370/394 |
| 7,111,139 | B2 * | 9/2006 | Osaki ...................... | 711/162 |
| 2003/0108045 | A1 * | 6/2003 | Jayam et al. .............. | 370/394 |
| 2003/0179712 | A1 * | 9/2003 | Kobayashi et al. .......... | 370/249 |
| 2005/0034049 | A1 * | 2/2005 | Nemawarkar et al. ........ | 714/758 |
| 2005/0152385 | A1 * | 7/2005 | Cioffi ..................... | 370/420 |
| 2006/0215689 | A1 * | 9/2006 | Liu et al. ................. | 370/465 |

* cited by examiner

*Primary Examiner* — Robert W Wilson
*Assistant Examiner* — Mohamed Kamara
(74) *Attorney, Agent, or Firm* — Ryan, Mason & Lewis, LLP

(57) ABSTRACT

A method and apparatus of reorganizing cells received over data communication lines at a receive node is provided. The cells have an initial order identified by monotonically increasing sequence identifiers. The receive node has buffers associated with respective ones of the communication lines. Each of the buffers has an output position. A cell having a smallest sequence identifier is detected from one or more cells at the output positions of the buffers. It is determined if the smallest sequence identifier is sequentially consecutive to a specified sequence identifier. If the smallest sequence identifier is sequentially consecutive to the specified sequence identifier, the cell having the smallest sequence identifier is dequeued from an output position of one of the buffers and the specified sequence identifier is redefined as the smallest sequence identifier.

26 Claims, 3 Drawing Sheets

METHODS AND APPARATUS FOR REORGANIZING CELLS BUFFERED AFTER TRANSMISSION

FIELD OF THE INVENTION

The present invention relates generally to communication systems, and more particularly to techniques for reorganizing cells received over a set of bundled data communication lines at a receive node.

BACKGROUND OF THE INVENTION

Asymmetric digital subscriber line (ADSL) connections use standard phone lines to deliver high speed data communications by utilizing a portion of a phone line's bandwidth that is not utilized by voice. This utilization allows for simultaneous voice and data transmission. The data transmission over an ADSL connection is continuously available, and ADSL technology helps to bring full-motion video, telecommuting and high-speed Internet access to a home or business. The line is termed "asymmetric" because it uses most of the channel to transmit downstream to the user, and only a small portion of the channel to receive upstream information from the user. A typical ADSL connection may deliver upstream at speeds of approximately 16-768 kilobytes per second (kbps) and downstream at speeds of approximately 1.5-10 megabytes per second (Mbps).

Since the origin of ADSL, improvements have been made in the technology in areas such as efficiency, affordability and functionality, resulting in the adoption of new standards. ADSL2 standards, completed and approved by the International Telecommunications Union (ITU) in 2002, supersede existing ADSL standards. Additionally, ADSL2+, approved by the ITU in January 2003, doubles the downstream bandwidth of ADSL2 to as much as approximately 25 Mbps.

Loop bonding technology provides the telecommunications industry with a revolutionary technique for combining multiple data communication lines, such as ADSL2 and ADSL2+ connections, together into a single, aggregated connection. This combination is possible even when multiple connections have different data rate capacities. In January 2005, the ITU passed the G.998.1 (G.Bond-ATM) standard. G.Bond-ATM enables ADSL equipment to electronically bond together ADSL2 or ADSL2+ links using multiple copper phone lines. These bonded links may be utilized to dramatically increase the bandwidth provisioned to subscribers, via a single asynchronous transmission mode (ATM) data stream, to approximately 45 Mbps. These ultra-high data rates support advanced services such as broadcast video and video on demand for customers otherwise out of reach because of their distance from the central office or digital loop carrier (DLC). Even multiple streams of high-definition television can be supported using bonded ADSL2+. The bonding, or other type of bundling, may be automated using software.

Disparate data rates may be supported among the bundled lines, for example, up to a ratio of 4:1. Thus, if some lines have lower capacity than others, it is not necessary to reduce the data rates of the other lines.

However, along with the benefits resulting from the ability to bundle and support disparate data rates among the set of bundled data communication lines come several disadvantages. Cells are assigned to lines in an order in accordance with their associated sequence identifiers (SIDs). However, the SID difference between simultaneously transmitted cells on different ADSL connections may increase due to the different data transmission speeds of the different lines. Buffers in a transmit node, corresponding to the ADSLs, that accept multiple cells and operate using a simple round robin cell assignment technique, may result in large SID differences. This is due to the fact that buffers associated with slow data communication lines may not be restricted from accepting cells with consecutively numbered SIDs.

A reorganization procedure at a receive node is required because ATM cells are received in a different sequence than that in which they were assigned to the lines, due to the differing line speeds. Thus, those cells arriving before their proper placement in the sequence, based on their SID, are buffered in a memory until the proper position in the sequence is reached. The reorganization procedure awaits the longest delayed cell that is out of order. Previous reorganization techniques implemented many operations and multiple tables to track the status of every cell in the buffers of the receive node, which resulted in complicated or unreliable recoveries from line errors.

Accordingly, what is needed is an improved approach to reorganizing buffered cells at a receive node, which were received over a set of bundled data communication lines.

SUMMARY OF THE INVENTION

The present invention in an illustrative embodiment provides techniques for reorganizing received cells in accordance with SIDs at a receive node of a set of bundled data communication lines.

In accordance with one aspect of the invention, a method of reorganizing cells received over data communication lines at a receive node is provided. The cells have an initial order identified by monotonically increasing sequence identifiers. The receive node has buffers associated with respective ones of the communication lines. Each of the buffers has an output position. A cell having a smallest sequence identifier is detected from one or more cells at the output positions of the buffers. It is determined if the smallest sequence identifier is sequentially consecutive to a specified sequence identifier. If the smallest sequence identifier is sequentially consecutive to the specified sequence identifier, the cell having the smallest sequence identifier is dequeued from an output position of one of the buffers and the specified sequence identifier is redefined as the smallest sequence identifier.

In an illustrative embodiment, before determining if the smallest sequence identifier is sequentially consecutive to a specified sequence identifier, a timeout counter is initialized. When at least one of the timeout counter has timed out and at least one buffer has reached a fullness threshold, the cell with the smallest sequence identifier is dequeued from an output position of one of the buffers and the specified sequence identifier is redefined as the smallest sequence identifier.

In an additional embodiment, when the smallest sequence identifier is not sequentially consecutive to a specified sequence identifier it is determined if the smallest sequence identifier is less than the specified sequence identifier. If the smallest sequence identifier is less than the specified sequence identifier, the queued cell with the smallest sequence identifier is discarded. If the smallest sequence identifier is not less than the specified sequence identifier and at least one buffer is empty, a cell having a sequence identifier sequentially consecutive to the specified sequence identifier is awaited. If the smallest sequence identifier is greater than the specified sequence identifier value and at least one buffer is not empty, the cell with the smallest sequence identifier is dequeued and the specified sequence identifier value is redefined as the value of the smallest sequence identifier.

Advantageously, the present invention in the illustrative embodiments provides a faster, more efficient and less expensive cell reorganization implementation. This implementation allows for robust recovery from transmission errors, timing out and buffer fullness thresholds, through utilization of FIFO buffers that do not require visibility of every cell location. Only those cells at the output ports of the FIFO buffers are considered by the methodology, which simplifies logic and memory storage requirements. The embodiments of the present invention also reduce the overall expense of G.Bond equipment by reducing the buffer size necessary for reorganization at a receive node. More specifically, the present invention allows for implementation of a reorganization engine, for example, in a low cost field programmable gate array (FPGA).

DETAILED DESCRIPTION OF THE INVENTION

The invention will be illustrated herein in conjunction with exemplary communication systems comprising one or more bidirectional data communication lines. It should be understood, however, that the invention is more generally applicable to any system comprising two or more data communication lines in which it is desirable to reorganize received cells or packets in accordance with assigned SIDs in a receive node of the communication system.

Figure 1:
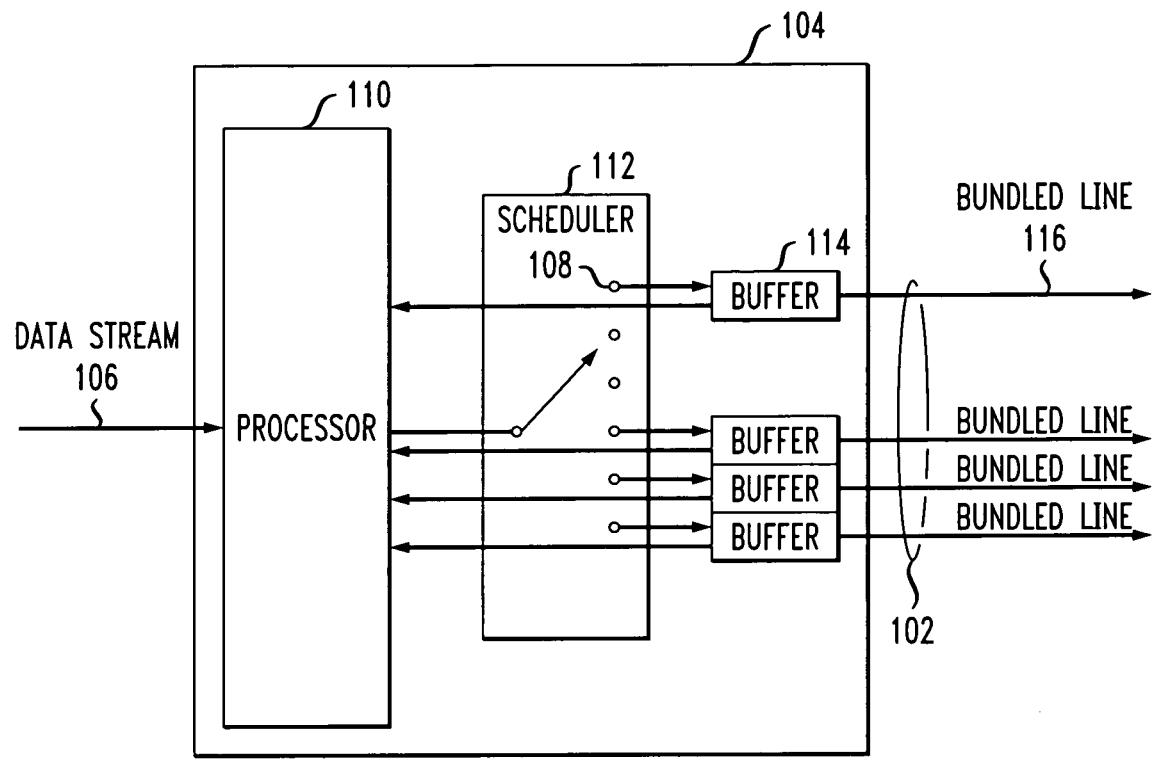
FIG. 1 is a block diagram illustrating a set of bundled data communication lines at a transmit node, according to an embodiment of the present invention.

Referring initially to FIG. 1, a block diagram illustrates a set of bundled data communication lines 102 at a transmit node 104, according to an embodiment of the present invention. A data stream 106 is received at transmit node 104. Data stream 106 is broken up into multiple data cells 108 by a processor 110 of transmit node 104 and labeled with sequence identifiers (SIDs). Data cells 108 are fed into a scheduler 112 of transmit node 104. In accordance with the embodiments of the present invention, data cells 108 are provided as a result of a fixed size packet application, for example, an ATM data cell of an ATM data stream. Scheduler 112 assigns data cells 108 to buffers 114. Each buffer 114 is associated with an individual bundled data communication line 116 in set of bundled data communication lines 102. Bundled data communication lines 102 may incorporate any bundled parallel data communication lines, including those having differing data transmission speeds, for example, ADSL, ADSL2, ADSL2+ or very high bit-rate digital subscriber line (VDSL).

Figure 2:
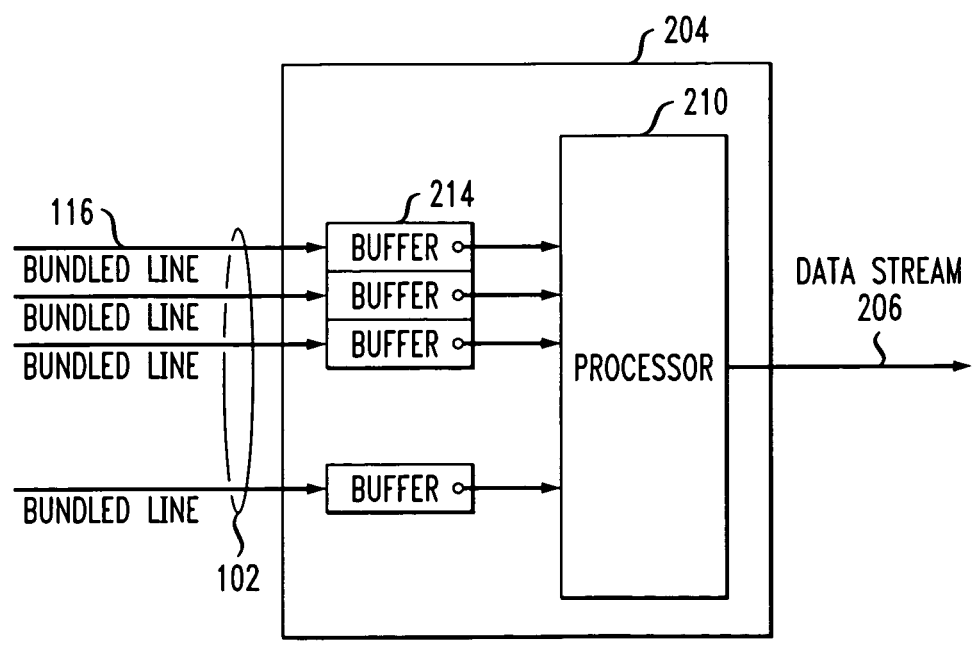
FIG. 2 is a block diagram illustrating a set of bundled data communication lines at a receive node, according to an embodiment of the present invention.

Referring now to FIG. 2, a block diagram illustrates a set of bundled data communication lines 102 at a receive node 204, according to an embodiment of the present invention. The data cells of FIG. 1 are transmitted to receive node 204 via bundled data communication lines 102. Each individual bundled data communication line 116 is associated with a buffer 214 of receive node 204, for reception and storage of the received cells before reorganization into sequential order according to the cells' SIDs. In a preferred embodiment of the present invention, buffers 214 are first-in first-out (FIFO) buffers, each having an output position where the next cell to be dequeued is situated. A smallest SID of those queued cells at output ports of the buffers 214 is referred to herein as SQSID. A SID of a last dequeued cell from an output position of a buffer 214 is referred to herein as DSID. In accordance with the embodiments of the present invention, a processor 210 determines the proper order to dequeue received cells from buffers 214 through an examination of the output ports, SQSID and DSID in order to reorganize the received cells and form a data stream 206.

Figure 3:
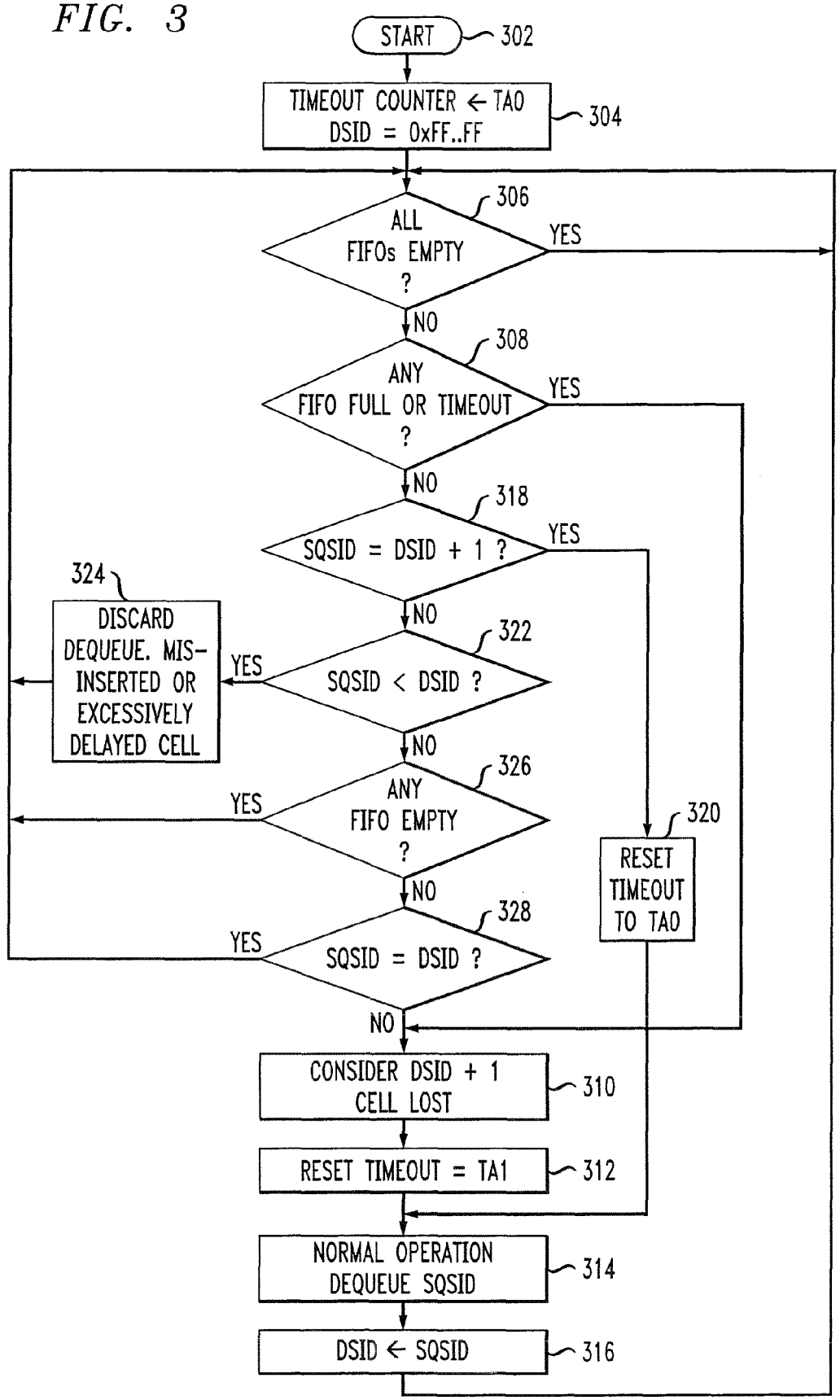
FIG. 3 is a flow diagram illustrating a received cell reorganization methodology, according to an embodiment of the present invention.

A flow diagram of FIG. 3 illustrates a received cell reorganization methodology, according to an embodiment of the present invention. This methodology takes place at the receive node of the communication system after one or more cells have been transmitted and/or received out of order, as evidenced by their respective SIDs, due to the differing transmission speeds of the bundled data communication lines. The methodology begins in block 302. In block 304, DSID, representing a SID of a last dequeued cell, is initialized by setting it equal to a series of 1's, 0xfff . . . ff, or mathematically written as 2 EXP (MAX SID BITS) −1, where MAX SID BITS is the number of bits used to represent the SID. For example, if a SID is represented by 16 bits, the initial value is FFFF hex.

Further, in block 304, a timeout counter is initialized. The timeout counter is loaded with a value of TA0, which corresponds to the maximum amount of time the system can afford to wait for a cell having a SID subsequent to DSID. This maximum amount of time is based on internal storage of the FIFO buffers in the receive node and latency specifications. It is recommended that this time be computed in relation to the maximum delay variation between any two cells sent on different transmission channels at a given point in time. TA0 may also be dynamically updated based on system status, such as FIFO buffer loads and timeout event profiles.

In block 306, it is determined if the FIFO buffers of the receive node are empty. More specifically, it is determined whether the system has received any cells. If a cell has not been received and the FIFO buffers are empty, the methodology will return to block 306. Thus, the reorganization methodology will not proceed until at least one cell is received at the receive node.

If a cell has been received and the FIFO buffers are not empty, the methodology proceeds to block 308, where it is determined whether any of the FIFO buffers in the receive node have reached a fullness threshold of received cells, or whether a timeout event relating to the timeout counter has occurred. Block 308 allows the methodology to execute specific steps dependent on system wait time and queue status.

The fullness threshold of the FIFO buffers may be determined and set based on a function of the communication line transmission speed, as well as communication line latency and random delay. As described above, in this embodiment of the present invention, the timeout counter is considered fixed at TA0, however, in alternative embodiments of the present invention, the timeout counter number may be dynamically altered.

If either of the events of block 308 is determined to have occurred, the cell having a SID subsequent to DSID in the sequence is considered lost in block 310. In block 312, the timeout counter is reset to TA1, which, in a preferred embodiment, is a considerably shorter amount of time than TA0. This is due to the fact that the timeout counter has either already timed out or is likely to be near timing out due to the existence of a full FIFO buffer. The setting of TA1 allows for a shorter amount of time for consequent cells to be received, which is less likely to result in an overflow of the FIFO buffers. In a preferred embodiment of the present invention TA1 is set equal to the slowest line intercell arrival time.

In block 314, the methodology continues by dequeuing a queued cell from an output position of one of the FIFO buffers having the smallest SID (SQSID) and in block 316, DSID is updated and set equal to the value of SQSID. The methodology then returns to block 306.

If either of the events of block 308 is determined to not have occurred, it is then determined in block 318 if SQSID succeeds DSID in the sequence, by determining if SQSID=DSID+1. If SQSID succeeds DSID in the sequence, the timeout counter is reset to TA0 in block 320, and the methodology continues in blocks 314 and 316, dequeuing SQSID as described above.

If the current SQSID does not succeed DSID in the sequence, it is determined in block 322 whether SQSID is less than DSID. If SQSID is less than DSID, then the cell associated with SQSID is discarded by dequeuing it into a virtual trash bin in block 324. This cell is discarded because a smaller SID indicates that either the cell associated with DSID was incorrectly inserted or the cell associated with SQSID is excessively delayed. The methodology then returns to block 306.

If it is determined that SQSID is not less than DSID in block 322, the methodology determines if any empty FIFO buffers exist in block 326. The fact that SQSID is not subsequent to DSID and is not less than DSID likely indicates that SQSID is further in the sequence than the SID subsequent to DSID. Thus, an empty FIFO buffer would allow a chance for a new cell to be received at an output position of a FIFO buffer that provides a new SQSID, which is subsequent to DSID. When an empty FIFO buffer exists, the methodology returns to block 306.

When an empty FIFO buffer does not exist, it is determined if SQSID=DSID in block 328, in order to test whether SQSID was updated since a last dequeuing action. When SQSID equals DSID, the SQSID was not yet updated by a parallel SQSID determination process, described in further detail below with regard to FIGS. 3 and 4. The methodology returns to block 306 to allow more time for the SQSID update. When SQSID does not equal DSID, the methodology labels the cell having the SID subsequent to DSID as lost and the methodology continues at block 310.

Additional mechanisms may also be implemented to take into account situations in which a communication line of the bundle is down and removed from the bundle. For example, this may be assumed when no cells are received for two consecutive timeouts. The management layer may consider any change in the empty status of a down link and reintegrate it in the bundle once it is ready to run within parameters.

Figure 4:
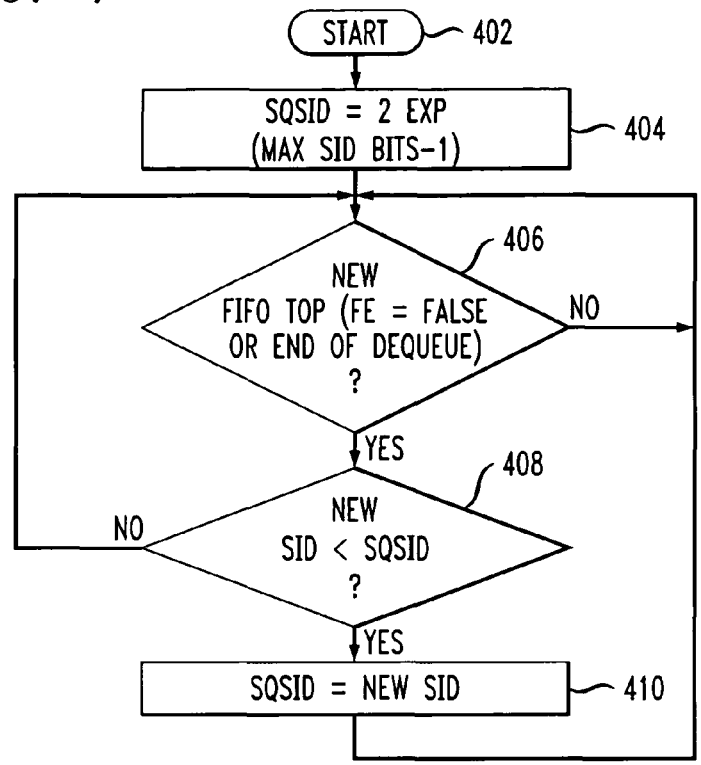
FIG. 4 is a flow diagram illustrating an event driven smallest queued SID determination methodology, according to an embodiment of the present invention.

Referring now to FIG. 4, a flow diagram illustrates an event driven SQSID determination methodology, according to an embodiment of the present invention. This methodology is performed in order to determine SQSID, or the smallest SID of those cells at the output ports of the FIFO buffers in the receive node. The methodology begins in block 402. In block 404 SQSID is initialized. The initial value of SQSID is provided as a series of 1's or mathematically written as 2 EXP (MAX SID BITS) −1, where max SID bits is the number of bits used to represent the SID. This is due to increased probability that next expected SID+1 is a series of 0's (0h) so the methodology would be forced into a wait state until the SQSID is updated by an arriving cell. This is similar to the technique utilized for the initialization of DSID in FIG. 3.

In block 406, it is determined if there is a new cell at an output position of one of the FIFO buffers. A new cell may be at the output position of a FIFO buffer when a formerly empty FIFO buffer receives a transmitted cell or when a cell has been dequeued from the output position of a FIFO buffer having multiple cells. More specifically, a new Invalid FE (FIFO empty) signal indicates that an output position of a FIFO buffer has received at least some or all of a new cell's data. The FE threshold level may be specified accordingly. In a preferred embodiment of the present invention, the system is designed so that a premature deactivation of this FE signal during a cell transfer does not cause starvation at the dequeuing end of the FIFO.

If it is determined that there is not a new cell at the output position of a FIFO buffer, the methodology repeats at block 406 until a new cell is found. If it is determined that there is a new cell at an output position of a FIFO buffer, it is determined if the SID of the new cell is less than SQSID in block 408. If the SID of the new cell is not less than SQSID, the methodology returns to block 406 to await a next new cell. If the SID of the new cell is less than the SQSID, SQSID is set equal to the SID of the new cell in block 410, and the methodology returns to block 406 to await a next new cell.

Figure 5:
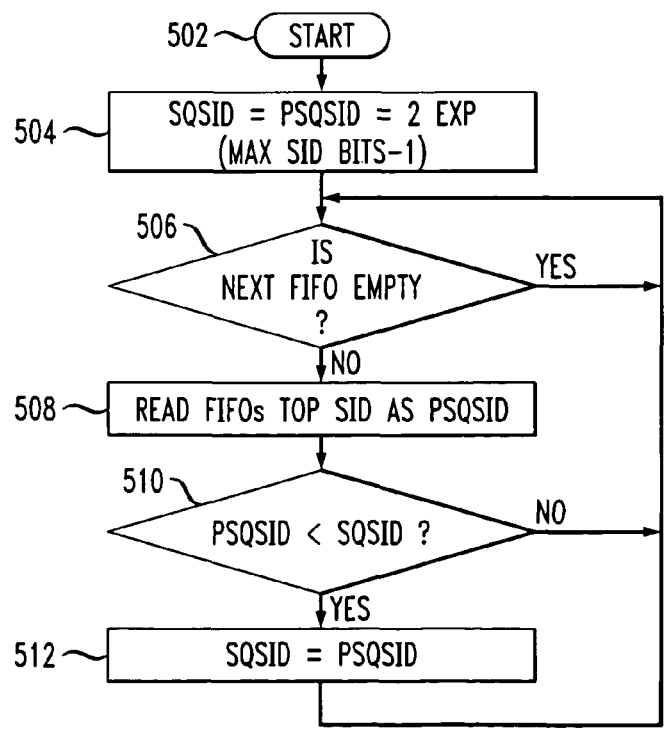
FIG. 5 is a flow diagram illustrating a polling driven smallest queued SID determination methodology, according to an embodiment of the present invention.

A flow diagram in FIG. 5 illustrates an alternative polling driven SQSID determination methodology, according to an embodiment of the present invention. The methodology begins in block 502. In block 504, SQSID is initialized as all 1's, or 0xfff . . . ff. The same value is assigned to a currently polled queued SID (PQSID). The methodology begins with a single line in the bundle. In block 506, it is determined if a FIFO buffer associated with the examined line in the bundle is empty. When the FIFO buffer is empty the methodology returns to block 506 to test a FIFO buffer associated with a next line in the bundle until one non-empty FIFO buffer is found. When a next FIFO buffer is not empty, the SID of a cell at the output position of the FIFO buffer is assigned as PSQSID in block 508. In block 510, it is determined if PSQSID is less than SQSID. If PSQSID is less than SQSID, SQSID is set equal to PSQSID in block 512, and the methodology returns to block 506. If PSQSID is not less than SQSID, the methodology simply returns to block 506 without updating SQSID value.

The present invention may be implemented in the form of one or more integrated circuits. For example, a given system node in accordance with the invention may be implemented as one or more integrated circuits comprising at least one processor and at least one memory. Numerous other configurations are possible.

In such an integrated circuit implementation, a plurality of identical die are typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

It is also possible to be implemented as a Software program of any other logical method to process information.

What is claimed is:

1. A method of reorganizing cells received over data communication lines at a receive node, the cells having an initial order identified by monotonically increasing sequence identifiers, the receive node having buffers associated with respective ones of the communication lines, and each of the buffers having an output position, the method comprising the steps of:
    detecting a cell having a smallest sequence identifier from one or more cells at the output positions of the buffers;
    determining if the smallest sequence identifier is sequentially consecutive to a specified sequence identifier;
    if the smallest sequence identifier is sequentially consecutive to the specified sequence identifier, dequeuing the cell having the smallest sequence identifier from an output position of one of the buffers and redefining the specified sequence identifier as the sequence identifier of the dequeued cell; and
    if the smallest sequence identifier is not sequentially consecutive to the specified sequence identifier:
        determining if the smallest sequence identifier is less than the specified sequence identifier;
        if the smallest sequence identifier is less than the specified sequence identifier, discarding the queued cell with the smallest sequence identifier;
        if the smallest sequence identifier is not less than the specified sequence identifier and at least one buffer is empty, awaiting a cell having a sequence identifier sequentially consecutive to the specified sequence identifier; and
        if the smallest sequence identifier is greater than the specified sequence identifier and at least one buffer is not empty, dequeuing the cell with the smallest sequence identifier, and redefining the specified sequence identifier as the sequence identifier of the dequeued cell;
    wherein the steps are performed at least in part by a processor.

2. The method of claim 1, further comprising the step of repeating the detecting, determining and dequeuing steps as long as any cells are queued in the buffers.

3. The method of claim 1, further comprising the step of initializing the specified sequence identifier.

4. The method of claim 1, wherein, before determining if the smallest sequence identifier is sequentially consecutive to the specified sequence identifier, further comprising the steps of:
    initializing a timeout counter; and
    when the timeout counter has timed out and/or at least one buffer has reached a fullness threshold, dequeuing the cell with the smallest sequence identifier from an output position of one of the buffers, and redefining the specified sequence identifier as the sequence identifier of the dequeued cell.

5. The method of claim 1, further comprising the step of constructing a data stream from the dequeued cells.

6. The method of claim 1, wherein the step of detecting a cell having a smallest sequence identifier comprises initializing a value for the smallest sequence identifier.

7. The method of claim 4, wherein, in the step of dequeuing the cell with the smallest sequence identifier, the fullness threshold is defined in accordance with transmission speeds of the communication lines.

8. The method of claim 4, wherein, in the step of initializing the timeout counter, the timeout counter corresponds to a maximum amount of time a system can await a cell having a sequence identifier sequentially consecutive to the specified sequence identifier.

9. The method of claim 4, further comprising the step of, when the timeout counter has timed out and/or at least one buffer has reached the fullness threshold, resetting the timeout counter.

10. The method of claim 4, further comprising the step of, if the smallest sequence identifier is sequentially consecutive to the specified sequence identifier, resetting the timeout counter.

11. The method of claim 9, wherein, in the step of resetting the timeout counter, the reset timeout counter is set for a shorter amount of time than the initialized time.

12. The method of claim 10, wherein, in the step of resetting the timeout counter, the timeout counter is reset to the initialized time.

13. A method of reorganizing cells received over data communication lines at a receive node, the cells having an initial order identified by monotonically increasing sequence identifiers, the receive node having buffers associated with respective ones of the communication lines, and each of the buffers having an output position, the method comprising the steps of:
    detecting a cell having a smallest sequence identifier from one or more cells at the output positions of the buffers;
    determining if the smallest sequence identifier is sequentially consecutive to a specified sequence identifier; and
    if the smallest sequence identifier is sequentially consecutive to the specified sequence identifier, dequeuing the cell having the smallest sequence identifier from an output position of one of the buffers and redefining the specified sequence identifier as the sequence identifier of the dequeued cell;
    wherein the step of detecting a cell having a smallest sequence identifier further comprises the steps of:
        when an output position of at least one buffer receives a new cell, determining if a sequence identifier of the new cell is less than the smallest sequence identifier;
        if the sequence identifier of the new cell is less than the smallest sequence identifier, redefining the smallest sequence identifier as the sequence identifier of the new cell; and
        when at least one of the sequence identifier of the new cell is not less than the smallest sequence identifier and the smallest sequence identifier is set equal to the sequence identifier of the new cell, awaiting a next new cell at an output position of at least one buffer; and
    wherein the steps are performed at least in part by a processor.

14. A method of reorganizing cells received over data communication lines at a receive node, the cells having an initial order identified by monotonically increasing sequence identifiers, the receive node having buffers associated with respective ones of the communication lines, and each of the buffers having an output position, the method comprising the steps of:
    detecting a cell having a smallest sequence identifier from one or more cells at the output positions of the buffers;
    determining if the smallest sequence identifier is sequentially consecutive to a specified sequence identifier; and
    if the smallest sequence identifier is sequentially consecutive to the specified sequence identifier, dequeuing the cell having the smallest sequence identifier from an output position of one of the buffers and redefining the specified sequence identifier as the sequence identifier of the dequeued cell;
wherein the step of detecting a cell having a smallest sequence identifier further comprises the steps of:
polling an output position of at least one buffer to define a polled sequence identifier;
determining if the polled sequence identifier is less than the smallest sequence identifier;
if the polled sequence identifier is less than the smallest sequence identifier, redefining the smallest sequence identifier as the polled sequence identifier; and
continuously repeating the polling, determining and redefining steps for each of the buffers; and
wherein the steps are performed at least in part by a processor.

15. A receive node for reorganizing cells received over data communication lines, the receive node comprising buffers associated with respective ones of the data communication lines, each of the buffers having an output position, and a processor, wherein the processor is configured to:
detect a cell having a smallest sequence identifier from one or more cells at the output positions of the buffers;
determine if the smallest sequence identifier is sequentially consecutive to a specified sequence identifier;
if the smallest sequence identifier is sequentially consecutive to the specified sequence identifier, dequeue the cell having the smallest sequence identifier from an output position of one of the buffers and redefine the specified sequence identifier as the sequence identifier of the dequeued cell; and
if the smallest sequence identifier is not sequentially consecutive to the specified sequence identifier:
determine if the smallest sequence identifier is less than the specified sequence identifier;
if the smallest sequence identifier is less than the specified sequence identifier, discard the queued cell with the smallest sequence identifier;
if the smallest sequence identifier is not less than the specified sequence identifier and at least one buffer is empty, await a cell having a sequence identifier sequentially consecutive to the specified sequence identifier; and
if the smallest sequence identifier is greater than the specified sequence identifier and at least one buffer is not empty, dequeue the cell with the smallest sequence identifier, and redefine the specified sequence identifier as the sequence identifier of the dequeued cell.

16. The receive node of claim 15, wherein the cells comprise a fixed-size packet.

17. The receive node of claim 15, wherein the data communication lines comprise a set of bundled parallel data communication lines having differing data transmission speeds.

18. The receive node of claim 15, wherein the data communication lines are bundled in accordance with a G.bond standard.

19. The receive node of claim 15, wherein the buffers comprise first-in, first-out (FIFO) buffers.

20. An integrated circuit device in the receive node of claim 15, the integrated circuit device comprising at least the processor.

21. The receive node of claim 16, wherein the fixed-size packet comprises an asynchronous transfer mode (ATM) data cell of an ATM data stream.

22. The receive node of claim 17, wherein the set of bundled parallel data communication lines comprise at least one of asymmetric digital subscriber line (ADSL), ADSL2, ADSL2+ and very high bit-rate digital subscriber line (VDSL).

23. A receive node for reorganizing cells received over data communication lines, the receive node comprising buffers associated with respective ones of the data communication lines, each of the buffers having an output position, and a processor, wherein the processor is configured to:
detect a cell having a smallest sequence identifier from one or more cells at the output positions of the buffers;
determine if the smallest sequence identifier is sequentially consecutive to a specified sequence identifier; and
if the smallest sequence identifier is sequentially consecutive to the specified sequence identifier, dequeue the cell having the smallest sequence identifier from an output position of one of the buffers and redefine the specified sequence identifier as the sequence identifier of the dequeued cell;
wherein detecting a cell having a smallest sequence identifier further comprises:
when an output position of at least one buffer receives a new cell, determining if a sequence identifier of the new cell is less than the smallest sequence identifier;
if the sequence identifier of the new cell is less than the smallest sequence identifier, redefining the smallest sequence identifier as the sequence identifier of the new cell; and
when at least one of the sequence identifier of the new cell is not less than the smallest sequence identifier and the smallest sequence identifier is set equal to the sequence identifier of the new cell, awaiting a next new cell at an output position of at least one buffer.

24. An integrated circuit device in the receive node of claim 23, the integrated circuit device comprising at least the processor.

25. A receive node for reorganizing cells received over data communication lines, the receive node comprising buffers associated with respective ones of the data communication lines, each of the buffers having an output position, and a processor, wherein the processor is configured to:
detect a cell having a smallest sequence identifier from one or more cells at the output positions of the buffers;
determine if the smallest sequence identifier is sequentially consecutive to a specified sequence identifier; and
if the smallest sequence identifier is sequentially consecutive to the specified sequence identifier, dequeue the cell having the smallest sequence identifier from an output position of one of the buffers and redefine the specified sequence identifier as the sequence identifier of the dequeued cell;
wherein detecting a cell having a smallest sequence identifier further comprises:
polling an output position of at least one buffer to define a polled sequence identifier;
determining if the polled sequence identifier is less than the smallest sequence identifier;
if the polled sequence identifier is less than the smallest sequence identifier, redefining the smallest sequence identifier as the polled sequence identifier; and
continuously repeating the polling, determining and redefining steps for each of the buffers.

26. An integrated circuit device in the receive node of claim 25, the integrated circuit device comprising at least the processor.

* * * * *